T. K. KEITH.
Feed-Operating Mechanism for Sewing-Machine.
No. 204,579. Patented June 4, 1878.
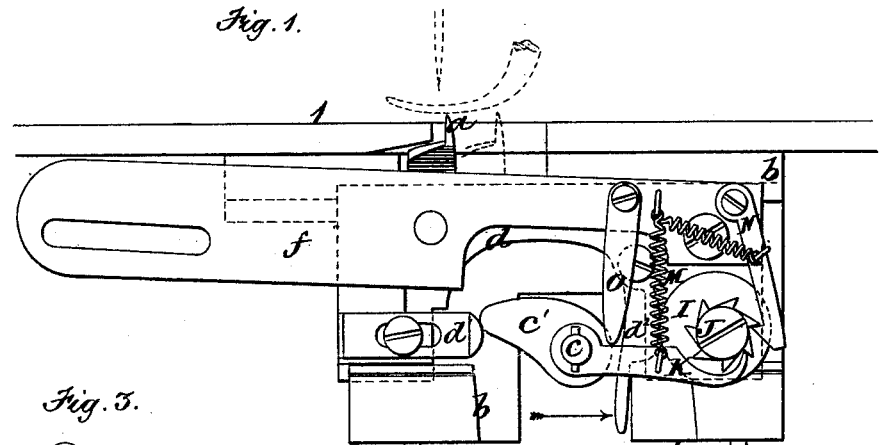
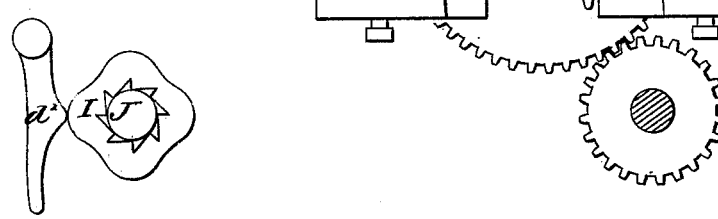
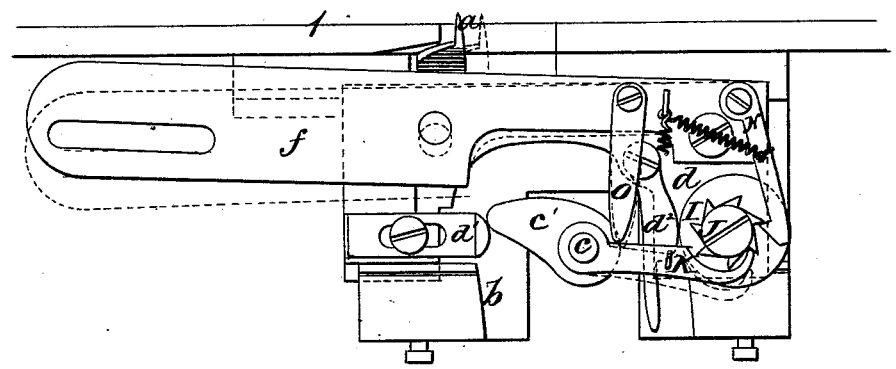
Witnesses.
Aley. L. Hayes.
H. E. Brown.
Inventor
T. K. Keith
by Wright & Brown
Attys.

UNITED STATES PATENT OFFICE.

THOMAS K. KEITH, OF HAVERHILL, MASSACHUSETTS, ASSIGNOR TO MOSES HOW, OF SAME PLACE.

IMPROVEMENT IN FEED-OPERATING MECHANISMS FOR SEWING-MACHINES.

Specification forming part of Letters Patent No. 204,579, dated June 4, 1878; application filed February 23, 1878.

*To all whom it may concern:*

Be it known that I, THOMAS K. KEITH, of Haverhill, in the county of Essex and State of Massachusetts, have invented certain Improvements in Feed-Operating Mechanisms for Sewing-Machines, of which the following is a specification:

This invention is an improvement on two patents granted to me, respectively, October 9, 1877, and November 6, 1877, both relating to a feed-dog adapted to reciprocate in a horizontal direction, the work or material being stitched, and thus cause the stitch-forming mechanism to produce a series of elongated stitches of uniform length, which the operator can combine in various ornamental designs by turning the work laterally during the operation, the feed-dog acting as a pivot; the patent of November 6, 1877, relating also to the combination of a reciprocating feed-dog with an ordinary feed for propelling the work in a single direction.

The present invention has for its object to enable the length of the stitches to be automatically varied for the purpose of giving greater variety to the ornamental designs produced; and to this end it consists, mainly, in the provision of means for automatically varying the length of stroke of the reciprocating feed described in said patents, so that the successive stitches formed while the feed is reciprocating will be of different lengths, the stitches preferably increasing in length until two or more are formed, and then decreasing in length until a like number are formed, the result being the production of a leaf-like pattern or group of stitches, if the operator turns the work to cause the stitches to radiate or diverge, as described in the above-named patents.

The invention also consists in the provision of means for rendering inoperative the devices for varying the length of the stitches when the reciprocating feed-dog is depressed and inoperative and the ordinary feed of the machine is in operation, all of which I will now proceed to describe.

Of the accompanying drawings, forming a part of this specification, Figures 1 and 2 represent side elevations of an attachment embodying my improvements, the stitch-regulating devices being shown in different positions. Fig. 3 represents a modification of the form of the stitch-regulating devices; and Fig. 4 represents some of the designs which may be produced by the joint operation of the mechanism shown in Figs. 1 and 2 and the stitch-forming mechanism of a sewing-machine.

Similar letters of reference refer to like parts in all the figures.

In the drawing, 1 represents the bed of a sewing-machine. $a$ represents the reciprocating feed-dog. $f$ represents the arm or lever to which the dog is attached. $d$ represents the sliding cross-head on which the arm $f$ and dog $a$ are supported, the arm $f$ being pivoted to the cross-head, the feed-dog being adapted to move up and down on the cross-head, and the cross-head being reciprocated by a cam, $c'$, and adapted to slide in guides on a bracket, $b$, which is attached to the bed 1, all as shown in my above-named patent of November 6, 1877. In said patent two adjustable bearings, $d^1$ and $d^2$, are shown for the cam $c'$ to strike against; but neither of these bearings was automatically adjustable; hence, in any series of successively-formed stitches the stitches were all of one length. I now adapt the bearing $d^2$ to be automatically adjusted after each reciprocation of the cross-head, so that the next reciprocation or forward and back movement of the cross-head will vary in length from the one preceding.

The bearing $d^1$ is substantially as shown in my last named patent, being attached to the cross-head by a screw passing through a slot, so that said bearing can be adjusted horizontally. The other bearing, $d^2$, consists, as before, of an arm pivoted to the cross-head; but in the present case this arm is backed by a cam, I, also pivoted to the cross-head, the arm $d^2$ bearing against the periphery of the cam I, and being interposed between the cam $c'$ and the cam I. To one side of the cam I is attached a ratchet, J, which is operated by a pawl, K.

In the operation of the machine the rotation of the cam $c'$ reciprocates the cross-head with the cam I and ratchet J. Each movement of the cross-head away from the needle of the sewing-machine carries the ratchet J far enough to enable the pawl K to engage with a new tooth of the ratchet, the pawl being pivoted to the shaft $c$ that carries the cam $c'$, and held against the ratchet by a spring, M.

The reverse or return movement of the cross-head causes the ratchet to be rotated by the pawl K, so that as the cross-head is reciprocated an intermittent rotation is imparted to the cam I, and said rotation causes the lever or bearing $d^2$ to move intermittently toward and away from the cam $c'$.

It will be seen that the nearer the bearing $d^2$ approaches the cam $c'$ the longer will be the movement imparted to the cross-head by the cam $c'$, as shown in Fig. 1, and vice versa, as shown in Fig. 2. Hence, during each complete rotation of the cam I, the successive movements of the feed-dog will gradually increase and then gradually diminish in length, the number of reciprocations or forward and back movements made by the feed-dog during said rotation corresponding to the number of teeth on the ratchet J, so that when the ratchet is provided with seven teeth, as shown in Figs. 1 and 2, the stitches will increase in length until four have been formed, and then decrease until three more have been formed, the result being a leaf-shaped pattern, as shown in Fig. 4, if the operator turns the work properly during the operation.

It is obvious that by using differently-shaped cams and ratchets the arrangement of the stitches can be varied to produce any design desired. For example, by using the cam shown in Fig. 3, the stitches will be caused to alternate in length.

A spring detent or dog, N, is provided to prevent the ratchet from rotating in the wrong direction.

When the reciprocating feed is lowered and rendered inoperative by the lever $f$, an arm, O, on said lever depresses the pawl K, and holds it out of contact with the ratchet J, as shown in dotted lines in Fig. 2, so that the ratchet J and cam I will not be rotated by the continued movement of the cross-head, the cam I being thus held in the position it occupied when the dog $a$ was last operating, so that when the dog is again operated it will be ready to commence properly a new series or group of elongated stitches similar to the last series produced.

I claim as my invention—

1. The combination of the feed-dog-carrying cross-head $d$, means, substantially as described, for reciprocating the same, and means, substantially as described, whereby the reciprocating movements of the cross-head and feed-dog are automatically varied in length, as set forth.

2. The feed-dog-carrying cross-head $d$, provided with the fixed bearing $d^1$ and pivoted or swinging bearing $d^2$, combined with the cam $c'$, for reciprocating the cross-head, the cam I, forming a backing for the bearing $d^2$, and the ratchet J and pawl K, arranged to rotate the cam I when the cross-head is reciprocated, as set forth.

3. The combination of the cam I and ratchet J with the cross-head $d$, having bearings $d^1 d^2$, arranged to be reciprocated by the cam $c'$ and the pawl K, pivoted to the non-reciprocating shaft $c$, as set forth.

4. The combination of the lever $f$ and arm O with the pawl K, substantially as and for the purpose specified.

In testimony whereof I have signed my name to this specification in the presence of two subscribing witnesses.

THOMAS K. KEITH.

Witnesses:
 GEO. W. PIERCE,
 C. F. BROWN.